(12) United States Patent
Van Cleve (10) Patent No.: US 8,671,779 B2
(45) Date of Patent: Mar. 18, 2014

(54) BALANCE SYSTEM FOR A VIBRATING FLOW METER

(75) Inventor: Craig Brainerd Van Cleve, Lyons, CO (US)

(73) Assignee: Micro Motion, Inc., Boulder, CO (US)

( * ) Notice: Subject to any disclaimer, the term of this patent is extended or adjusted under 35 U.S.C. 154(b) by 165 days.

(21) Appl. No.: 13/320,597

(22) PCT Filed: Jun. 10, 2009

(86) PCT No.: PCT/US2009/046838
§ 371 (c)(1),
(2), (4) Date: Nov. 15, 2011

(87) PCT Pub. No.: WO2010/144082
PCT Pub. Date: Dec. 16, 2010

(65) Prior Publication Data
US 2012/0067137 A1    Mar. 22, 2012

(51) Int. Cl.
*G01F 1/84* (2006.01)
(52) U.S. Cl.
USPC .................................................. 73/861.357
(58) Field of Classification Search
USPC ..................................... 73/861.355–861.357
See application file for complete search history.

(56) References Cited

U.S. PATENT DOCUMENTS

| 4,187,721 | A | 2/1980 | Smith |
| 5,663,509 | A | 9/1997 | Lew et al. |
| 6,401,548 | B1 | 6/2002 | Drahm et al. |
| 6,564,650 | B2 * | 5/2003 | Ollila et al. ............. 73/861.355 |
| 6,776,053 | B2 * | 8/2004 | Schlosser et al. ........ 73/861.355 |
| 7,111,519 | B2 * | 9/2006 | Dille ....................... 73/861.355 |
| 2002/0174730 | A1 | 11/2002 | Drahm et al. |

FOREIGN PATENT DOCUMENTS

| JP | 09138150 | | 5/1997 |
| JP | 2002502960 | A1 | 8/1999 |
| SU | 179234 | A1 | 2/1993 |
| WO | 9940394 | A1 | 8/1999 |
| WO | 2007130024 | A1 | 11/2007 |

* cited by examiner

*Primary Examiner* — Jewel V Thompson
(74) *Attorney, Agent, or Firm* — The Ollila Law Group LLC (57) ABSTRACT

According to the present invention, a vibrating flow meter and method of operating a vibrating flow meter are provided. The vibrating flow meter includes a conduit (210), at least one pick-off (230, 231), a driven member (250), at least one driver (220), and a base (260). The conduit (210) defines a fluid flow path. The at least one pick-off (230, 231) measures the motion of the conduit (210). The at least one driver (220) vibrates the conduit (210) and the driven member (250) in phase opposition. The base (260) is coupled to the conduit (210) and the driven member (250) and switches between remaining substantially stationary or moving substantially in phase with the conduit (210) or moving substantially in phase with the driven member (250) in order to balance the motion of the conduit (210) and the driven member (250).

24 Claims, 5 Drawing Sheets

BALANCE SYSTEM FOR A VIBRATING FLOW METER

FIELD OF THE INVENTION

The present invention relates to a balance system for a vibrating flow meter.

BACKGROUND OF THE INVENTION

Vibrating flow meters such as, for example, densitometers and Coriolis flow meters are used for measuring a characteristic of flowing substances, such as, for example, density, mass flow rate, volume flow rate, totalized mass flow, temperature, and other information. Vibrating flow meters include one or more conduits, which may have a variety of shapes, such as, for example, straight, U-shaped, or irregular configurations.

The one or more conduits have a set of natural vibration modes, including, for example, simple bending, torsional, radial, and coupled modes. The one or more conduits are vibrated by at least one driver at a resonance frequency in one of these modes for purposes of determining a characteristic of the flowing substance. One or more electronics transmit a sinusoidal driver signal to the at least one driver, which is typically a magnet/coil combination, with the magnet typically being affixed to the conduit and the coil being affixed to a mounting structure or to another conduit. The driver signal causes the driver to vibrate the one or more conduits at the driver frequency in the driver mode. For example, the driver signal may be a periodic electrical current transmitted to the coil.

At least one pick-off detects the motion of the conduit(s) and generates a sinusoidal pick-off signal representative of the motion of the vibrating conduit(s). The pick-off is typically a magnet/coil combination, with the magnet typically being affixed to one conduit and the coil being affixed to a mounting structure or to another conduit. The pick-off signal is transmitted to the one or more electronics; and according to well known principals the pick-off signal may be used by the one or more electronics to determine a characteristic of the flowing substance or adjust the driver signal, if necessary.

Typically, vibrating flow meters are provided with two vibrating conduits that vibrate in opposition to each other in order to create an inherently balanced system. As a result, the vibrations from each conduit cancel each other out in a manner that prevents vibration or torque forces from being transmitted to any connecting structures. Likewise, when two vibrating conduits are used, vibrations of the mounting structure are canceled in the flow meter because the pick-offs generally measure only relative motion between the flow tubes, and externally induced vibrations tend to vibrate both tubes equally. There are, however, certain applications where dual conduits are undesirable, for example, due to problems with pressure drops or clogging. In such situations a single conduit system may be desirable.

However desirous a single conduit system may be, single conduit systems present inherent imbalance problems. Attempts at solving this problem have involved using a balancing structure, for example, a dummy tube or a balance bar, and using the motion of the balancing structure to balance out the system. Since, however, the overall mass of the tube, including the fluid within the tube, changes as the density of the fluid within the tube changes, these techniques by themselves have received limited success at eliminating imbalance problems.

Figure 1:
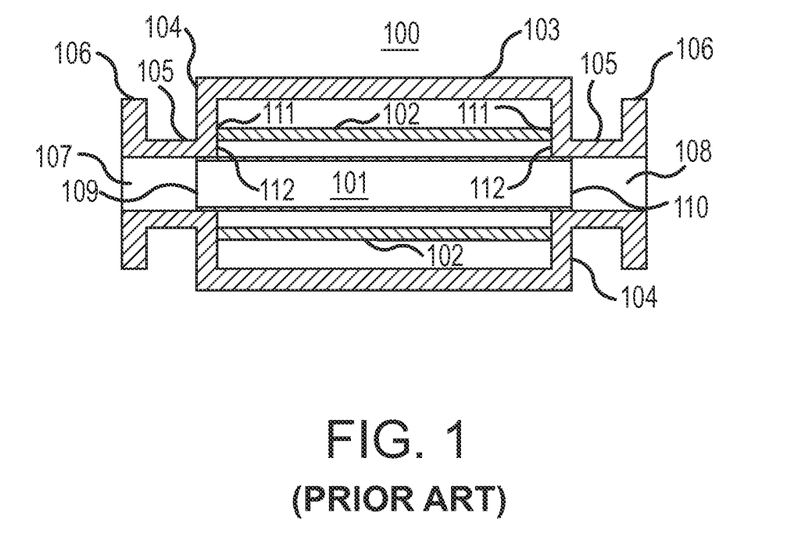
FIG. 1 depicts a prior art single conduit type vibrating flow meter.

FIG. 1 depicts a single conduit type vibrating flow meter according to the prior art. As shown, the flow meter includes a case 103 enclosing a balance bar 102. The balance bar 102 is cylindrical and encloses conduit 101. Case 103 has end elements 104 coupled by neck elements 105 to input and output flanges 106. Element 107 is the input to the flow meter; element 108 is the output. Conduit 101 has an input end 109 connected to an opening in case end 104 at element 112 which is the brace bar portion of case end 104. Brace bar portion 112 is coupled to neck element 105. On the right side, the output end 110 of conduit 101 is coupled to the case end 104 at location 112 where case end 104 joins neck element 105.

In operation, conduit 101 and balance bar 102 are vibrated in phase opposition by a driver (not shown). With substance flowing, the vibration of conduit 101 in this example induces a Coriolis response in conduit 101 that is detected by pick-off sensors (not shown). The phase displacement between the pick-off sensors represents information pertaining to the flowing substance. The signal output of the velocity sensors is applied to electronics circuitry that processes the signals to derive the desired information pertaining to the flowing substance, such as for example a mass flow rate, a density, a viscosity, etc.

It is necessary that a vibrating flow meter provide accurate information over a wide range of operating conditions including substances of different density, temperature, and viscosity. In order to achieve this, it is desirable that the flow meter operate stably over a range of conditions. In order to achieve this stability, it is desirable for the flow meter vibrations to be isolated to the conduit and balance system, because vibrations external to the vibratory system, whether induced by the vibrations of the flow meter or from another source, such as a pump, imposes additional accelerations on the flowing substance besides the Coriolis acceleration used to determine the fluid characteristics of the flowing substance. External vibration also repositions the nodes (area experiencing no motion) defining the active length of conduit. This effect is difficult to compensate for and is subject to unknowable parameters such as the rigidity of the structure to which the meter is connected. Accordingly, undesired vibrations impede the ability of the flow meter to provide accurate output information regarding the flowing substance.

For the flow meter of FIG. 1, the vibrating system includes balance bar 102 and conduit 101, which are vibrated in phase opposition. These two elements comprise a dynamically balanced system in which the ends 111 of balance bar and ends 109 and 110 of the conduit 101 are coupled by brace bar portion 112 of case end 104. This is undesirable since the processing of substances of different densities may cause the vibration of the case and flanges. Because the vibration amplitude of the case 103 and flanges 106 is dependent upon the stiffness of the structure to which the meter is mounted, error of unknown magnitude can be induced in the flow measurement.

The better attempts at solving imbalance problems that arise due to changes in the density of the fluid involve adjusting the ratio of the vibration amplitude of the conduit relative to the vibration amplitude of the counterbalance structure. In other words, momentum is what is being balanced, momentum is the product of mass and velocity, and velocity is proportional to vibration amplitude. If, for example, the mass of a conduit (including the fluid located inside) and the mass of the counterbalance structure were initially equal and then the mass of the conduit were doubled (for example, as a result of a density increase in the fluid within the conduit), then reducing the amplitude of the conduit by half would restore balance to the conduit/counterbalance system. In practice, the combined amplitude of both the counterbalance structure and the conduit can be controlled by meter electronics. Accordingly, the conduit amplitude may be reduced to a lesser extent and the balance structure amplitude may be increased to some extent until in the above example, the ratio of the counterbalance amplitude relative to the conduit amplitude is 2:1.

Adjusting the amplitude in traditional methods has a significant drawback in that it results in the repositioning of motionless nodes that reside along the axis of the vibrating structure. Node relocation is a problem in flow meters because the nodes are typically located on the conduit where the balance structure joins the conduit. Accordingly, the area between the nodes usually defines the active length of the conduit. The active length affects the measurement sensitivity. Further, if the nodes reposition, then the end portions of the tube may vibrate, this further causes the flanges to vibrate. These undesirable vibrations can further affect the measurement sensitivity.

The traditional method of getting the amplitude ratio to change is to isolate the vibrating structure (conduit, balance bar, and connecting structure) with a very soft mount. The idea is that a vibrating structure isolated in space is always balanced. For example if a spring joins two equal masses in space, such that when set vibrating out of phase with each other, the masses vibrate with equal amplitude, then the spring has a motionless node half way between the masses. If one mass were to be increased and the masses were again set vibrating, the vibration amplitude of the increased mass automatically decreases, and the vibration amplitude of the other mass automatically increases to keep the momentum balanced. However, as a consequence, the new position of the node is closer to the larger mass. The vibrating structure of a vibrating flow meter is similar, and node relocation is a problem for similar reasons.

The present invention is directed to a balance system for a vibrating flow meter.

SUMMARY OF THE INVENTION

The scope of the present invention is defined solely by the appended claims, and is not affected to any degree by the statements within this summary.

According to one embodiment of the present invention, a vibrating flow meter comprises a conduit defining a fluid flow path, at least one pick-off that measures the motion of the conduit, a driven member, at least one driver that vibrates the conduit and the driven member in phase opposition, and a base coupled to the conduit and the driven member, said base switching between remaining substantially stationary or moving substantially in phase with the conduit or moving substantially in phase with the driven member in order to balance the motion of the conduit and the driven member.

According to another aspect of the present invention, a method of operating a vibrating flow meter comprises the steps of providing a conduit defining a flow path that receives a flowing substance, providing at least one pick-off that measures the motion of the conduit, providing a driven member, providing at least one driver that vibrates the conduit and the driven member in phase opposition, providing a base coupled to the conduit and the driven member, and switching the base between remaining substantially stationary or moving substantially in phase with the conduit or moving substantially in phase with the driven member in order to balance the motion of the conduit and the driven member.

ASPECTS

According to one aspect of the present invention, a vibrating flow meter comprises:

a conduit defining a fluid flow path;
at least one pick-off that measures the motion of the conduit;
a driven member;
at least one driver that vibrates the conduit and the driven member in phase opposition;
a base coupled to the conduit and the driven member, said base switching between remaining substantially stationary or moving substantially in phase with the conduit or moving substantially in phase with the driven member in order to balance the motion of the conduit and the driven member.

Preferably, the driven member is a cantilevered arm that extends generally orthogonal to the base.

Preferably, the base is a coupled to end portions of the conduit via a pair of connectors.

Preferably, the base is provided with a mass at least 5 times greater than that of the driven member.

Preferably, the base is provided with a base that is at least 3 times greater than the mass of the conduit.

Preferably, the at least one pick-off is located on at least one pick-off arm that extends from the base.

Preferably, the vibrating flow meter further comprises a case and case connects that include a first portion coupled to the conduit and a second portion coupled to the case.

Preferably, the vibrating flow meter further comprises:
a case;
case connects that include a first portion coupled to the conduit and a second portion coupled to the case;
a pair of connectors that couple the base to end portions of the conduit; and
a pair of flanges coupled to the conduit, wherein the case connects are the only structure supporting the conduit located between the flanges and the connectors.

Preferably, the vibrating flow meter further comprises
a case;
case connects that include a first portion coupled to the conduit and a second portion coupled to the case;
a pair of connectors that couple the base to opposite end portions of the conduit; and
a pair of flanges coupled to the conduit, wherein the case connects are the only structure supporting the conduit located between the flanges and the connectors and the end portions extend between the connectors and the flanges and are provided with a length dimensioned to reduce the torque applied to the flanges.

According to another aspect of the present invention, a method of operating a vibrating flow meter comprises the steps of:
providing a conduit defining a flow path that receives a flowing substance;
providing at least one pick-off that measures the motion of the conduit;
providing a driven member;
providing at least one driver that vibrates the conduit and the driven member in phase opposition; and
providing a base coupled to the conduit and the driven member;
switching the base between remaining substantially stationary or moving substantially in phase with the conduit or moving substantially in phase with the driven member in order to balance the motion of the conduit and the driven member.

Preferably, the base switches between moving in phase with the conduit and moving in phase with the driven member according to the density of the flowing substance.

Preferably, the base is substantially stationary when the flowing substance has a first specific gravity, moves in phase with the driven member when the flowing substance has second specific gravity that is greater than the first specific gravity, and moves in phase with the conduit when the flowing substance has third specific gravity that is less than the first specific gravity.

Preferably, the base is substantially stationary when the flowing substance has a specific gravity substantially equal to 1000 kg/m$^3$.

Preferably, the base is substantially stationary when the conduit is substantially empty.

Preferably, the base moves in phase with the driven member when the flowing substance has a specific gravity greater than 1000 kg/m$^3$.

Preferably, the base moves in phase with the conduit when the flowing substance has a specific gravity less than 1000 kg/m$^3$.

Preferably, the driven member is a cantilevered arm that extends generally orthogonal to the base.

Preferably, the base is a coupled to end portions of the conduit via a pair of connectors.

Preferably, the base is provided with a mass at least 5 times greater than that of the driven member.

Preferably, the base is provided with a base that is at least 3 times greater than the mass of the conduit.

Preferably, the at least one pick-off is located on at least one pick-off arm.

Preferably, the method further comprises the steps of:
providing a case;
providing case connects that include a first portion coupled to the conduit and a second portion coupled to the case.

Preferably, the method further comprises the steps of:
providing a case;
providing case connects that include a first portion coupled to the conduit and a second portion coupled to the case;
providing a pair of connectors that couple the base to end portions of the conduit; and
providing a pair of flanges coupled to the conduit, wherein the case connects are the only structure located between the flanges and the connectors.

Preferably, the method further comprises the steps of:
providing a case;
providing case connects that include a first portion coupled to the conduit and a second portion coupled to the case;
providing a pair of connectors that couple the base to end portions of the conduit; and
providing a pair of flanges coupled to the conduit, wherein the case connects are the only structure located between the flanges and the connectors and the end portions extend between the connectors and the flanges and are provided with a length dimensioned to reduce the torque applied to the flanges.

DETAILED DESCRIPTION OF THE PRESENTLY PREFERRED EMBODIMENT

FIGS. 2-5 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

FIG. 2-5 illustrates an example of a vibrating flow meter 205 in the form of a Coriolis flow meter, comprising a sensor assembly 206, and a balance structure 208. The one or more meter electronics 207 are connected to sensor assembly 206 via leads 110, 111, 111' to measure a characteristic of a flowing substance, such as, for example, density, mass flow rate, volume flow rate, totalized mass flow, temperature, and other information. The meter electronics 207 can transmit the information to a user or other processor via lead 26.

The sensor assembly 206 includes a conduit 210 that defines a flow path for receiving a flowing substance. The conduit 210 may be bent, as shown, or may be provided with any other shape, such as a straight configuration or an irregular configuration. When sensor assembly 206 is inserted into a pipeline system which carries the flowing substance, the substance enters sensor assembly 206 through an inlet flange (not shown), then it flows through the conduit 210, where a characteristic of the flowing substance is measured. Following this, the flowing substance exits the conduit 210 and passes through an outlet flange (not shown). Those of ordinary skill in the art appreciate that the conduit 210 can be connected to the flanges, such as flanges 106, shown in FIG. 1, via a variety of suitable means. In the present embodiment, the conduit 210 is provided with end portions 211, 212 that extend generally from connectors 270, 271 and connect to the flanges at their outer extremities.

Figure 3:
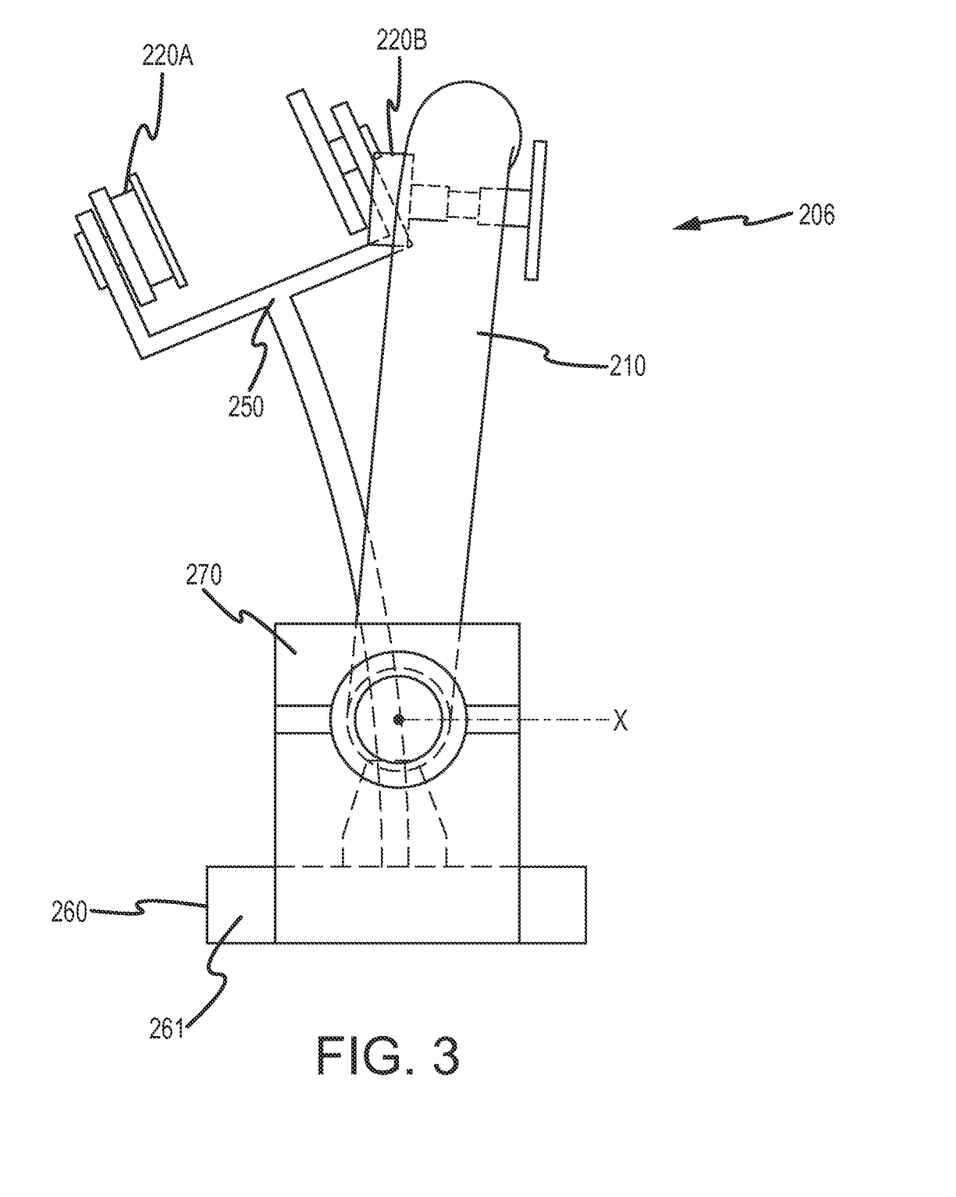
FIG. 3 depicts a vibrating flow meter according to an embodiment of the present invention.

The sensor assembly 206 of the present example includes at least one driver 220. The driver 220 includes a first portion 220A connected to a driven member 250 of the balance structure 208 and a second portion 220B connected to the conduit 210. The first and second portions 220A, 220B may correspond to a drive coil 220A and a drive magnet 220B, for example. In the present embodiment, the driver 220 preferably drives the driven member 250 and conduit 210 in phase opposition. As shown in FIG. 3, the driven member 250 and conduit 210 are preferably driven about bending axis X, which is defined in part by the connectors 270, 271. According to an embodiment of the invention, the bending axis X corresponds to the inlet-outlet tube axis. The driven member 250 bends from the base 260 and thus, does not have a stationary bending axis. The driver 220 may comprise one of many well known arrangements, including for example, and not limitation piezoelectric elements or an electromagnetic coil/magnet arrangement.

Figure 2:
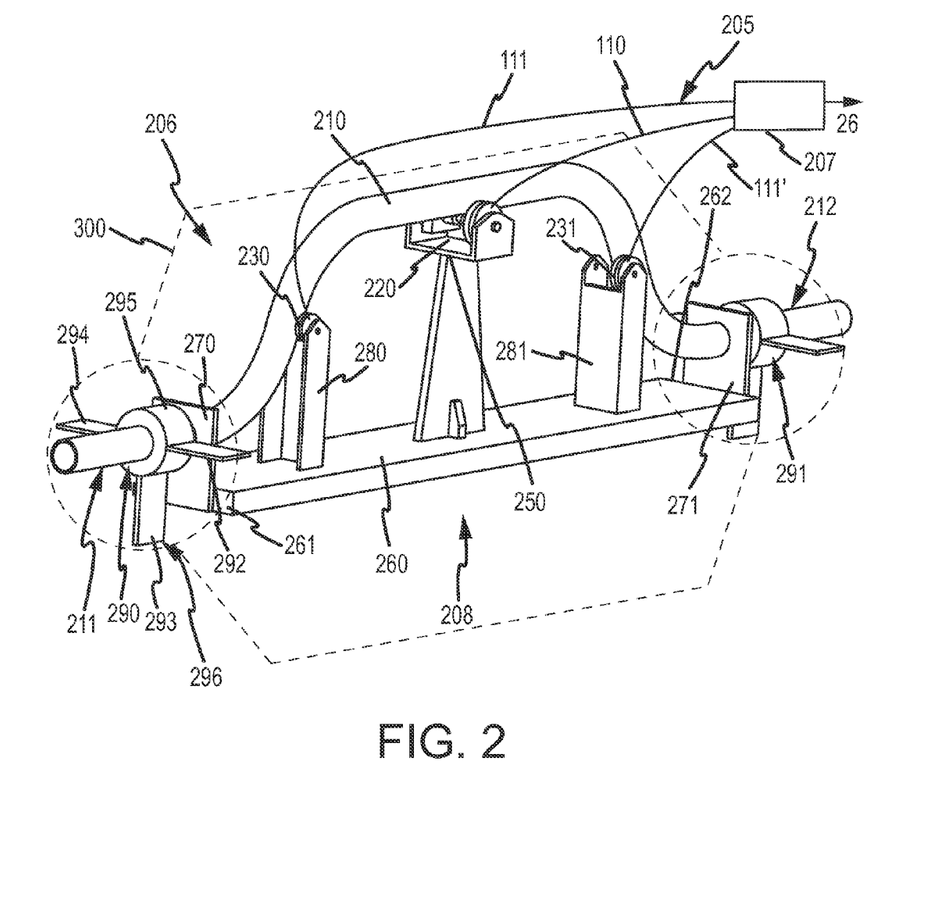
FIG. 2 depicts a vibrating flow meter according to an embodiment of the present invention.

As shown in FIG. 2, the sensor assembly 206 includes at least one pick-off and in the present embodiment is shown provided with a pair of pick-offs 230, 231. According to one aspect of the present embodiment, the pick-offs 230, 231 measure the motion of the conduit 210. In the present embodiment, the pick-offs 230, 231 include a first portion located on respective pick-off arms 280, 281 and a second portion located on the conduit 210. The pick-off(s) may comprise one of many well known arrangements, including for example, and not limitation piezoelectric elements, capacitance elements, or an electromagnetic coil/magnet arrangement. Therefore, like the driver 220, the first portion of the pick-off may comprise a pick-off coil while the second portion of the pick-off may comprise a pick-off magnet. Those of ordinary skill in the art will appreciate that the motion of the conduit 210 is related to certain characteristics of the flowing substance, for example, the mass flow rate or density of the flowing substance through the conduit 210.

Those of ordinary skill in the art will appreciate that the one or more meter electronics 207 receive the pick-off signals from the pick-offs 230, 231 and provide a drive signal to the driver 220. The one or more electronics 207 can measure a characteristic of a flowing substance, such as, for example, density, mass flow rate, volume flow rate, totalized mass flow, temperature, and other information. The one or more electronics 207 may also receive one or more other signals from, for example, one or more temperature sensors (not shown), and one or more pressure sensors (not shown), and use this information to measure a characteristic of a flowing substance. Those of ordinary skill in the art will appreciate that the number and type of sensors will depend on the particular measured characteristic.

FIGS. 2-5 also depict the balance structure 208 of the present embodiment. According to one aspect of the present embodiment, the balance structure 208 is configured to at least partially balance the vibrations of the conduit 210. According to one aspect of the present embodiment, the balance structure 208 is configured to at least partially balance the momentum of the conduit 210.

As shown in FIGS. 2-5, the balance structure 208 includes a base 260 connected to a driven member 250. As shown, the driven member 250 is preferably a cantilevered arm that extends generally orthogonal from the base 260. The base 260 in the present embodiment is preferably relatively massive and immobile as compared to the driven member 250. For example, and not limitation, the base 260 may be provided with a mass at least 5 times greater than that of the driven member 250. For example and not limitation, the base 260 may be provided with a mass at least 5 times greater than the mass of the conduit 210. In some embodiments, these numbers may be greater, for example 14 and 8 times greater than the driven member 250 and the conduit 210, respectively.

The balance structure 208 in the present embodiment is coupled to the conduit 210. As shown, the base 260 includes a pair of connectors 270, 271, which may be in the form of the plates shown or which may be provided with any other shape. In the present embodiment, the connectors 270, 271 couple the base 260 to an interior of the end portions 211, 212 of the conduit 210. In the embodiment shown, the pair of connectors 270, 271 are coupled to opposing end faces 261, 262 of the base 260 to the respective end portions 211, 212 of the conduit 210.

According to one aspect of the present embodiment, the conduit 210, the driven member 250, and the base 260 are configured to provide a balanced system. It should be appreciated that the system may not be absolutely balanced; however, the system is designed to be more balanced than prior art systems that do not include the balance structure 208. In the present embodiment, the conduit 210 and the driven member 250 act as two separate vibrating systems, which are driven at equal resonant frequencies, in phase opposition about axis X. As shown in FIG. 3, the driven member 250 vibrates at its resonant frequency by flexing upon the base 260. Those of ordinary skill in the art will appreciate that FIG. 3 represents an exaggeration of the motions involved, in order to better convey the concepts of the present embodiment. Also shown in FIG. 3, the conduit 210 vibrates out of phase with the driven member 250.

The motion of the conduit 210 about axis X applies torque to the connectors 270, 271. Those of ordinary skill in the art will also appreciate that the motion of the driven member 250 about the axis X also applies torque to the connectors 270, 271, via the base 260. Assuming, for the sake of simplicity, that the mass of the conduit 210, including the mass of the flowing substance, and the mass of the driven member 250 are equal, then the driven member 250 and conduit 210 may be driven in phase opposition, at equal frequency, and with equal amplitude to provide a balanced system.

In this example, the momentum of both the conduit 210 and the driven member 250 are balanced, since momentum is the product of mass and velocity and velocity is proportional to vibration amplitude. The result being that the torques applied to the connectors 270, 271 are nearly equal and of opposite sign, thus, canceling out. Further, motionless nodes are located substantially along the end portion 211, 212 axes and substantially where the connectors 270, 271 connect to the conduit 210. Accordingly an overall balanced system is provided and torque and vibrations substantially cancel out. Furthermore, little or no torque is applied to the outer extremities of the end portions 211, 212 of the conduit 210 and to the flanges.

According to one aspect of the present embodiment, the conduit 210 and balance structure 208 are preferably isolated from any connecting structures, by relatively soft mounts, which are designed to limit the translation of motion to any connecting structures. Accordingly, the conduit 210 and balance structure 208 function as an isolated vibrating structure with two masses vibrating in phase opposition at the same frequency, which self balances. Accordingly, there are two vibrating systems, i.e. a vibrating conduit system, which may include the conduit 210 or the conduit 210, as well as the connectors 270, 271 and the base 260, and the vibrating driven member system, which may include the driven member 250 or the driven member 250, as well as the connectors 270, 271 and base 260, as hereinafter discussed. The two vibrating systems are separated by common motionless nodes that preferably substantially lie upon the axis of end portions 211, 212 of the conduit 210, substantially proximate to the connectors 270, 271.

Advantageously, the present arrangement may also provide numerous advantages when the mass of the conduit 210 changes. For example, the mass of the conduit 210 may increase, such as, for example, when the mass of the flowing substance within the conduit 210 increases or the mass of the conduit 210 itself increases due to, for example, material build up. When this occurs, the vibration frequency and the vibration amplitude of the conduit 210 decrease. This occurs automatically as a result of the additional mass and the soft mounting of the combined vibrating structure. Further, as a natural response, the vibration amplitude of the driven member 250 increases. This change in amplitude ratio causes node relocation. However, the nodes merely move inward along the conduit axis X in a region where the conduit's motion is purely rotational. The pure rotation may be ensured using the case connects 290, 291 as described below. Because no Coriolis force is generated by pure rotation about the conduit's axis X, the motion of the nodes along the axis X does not affect the output signal.

Figure 4:
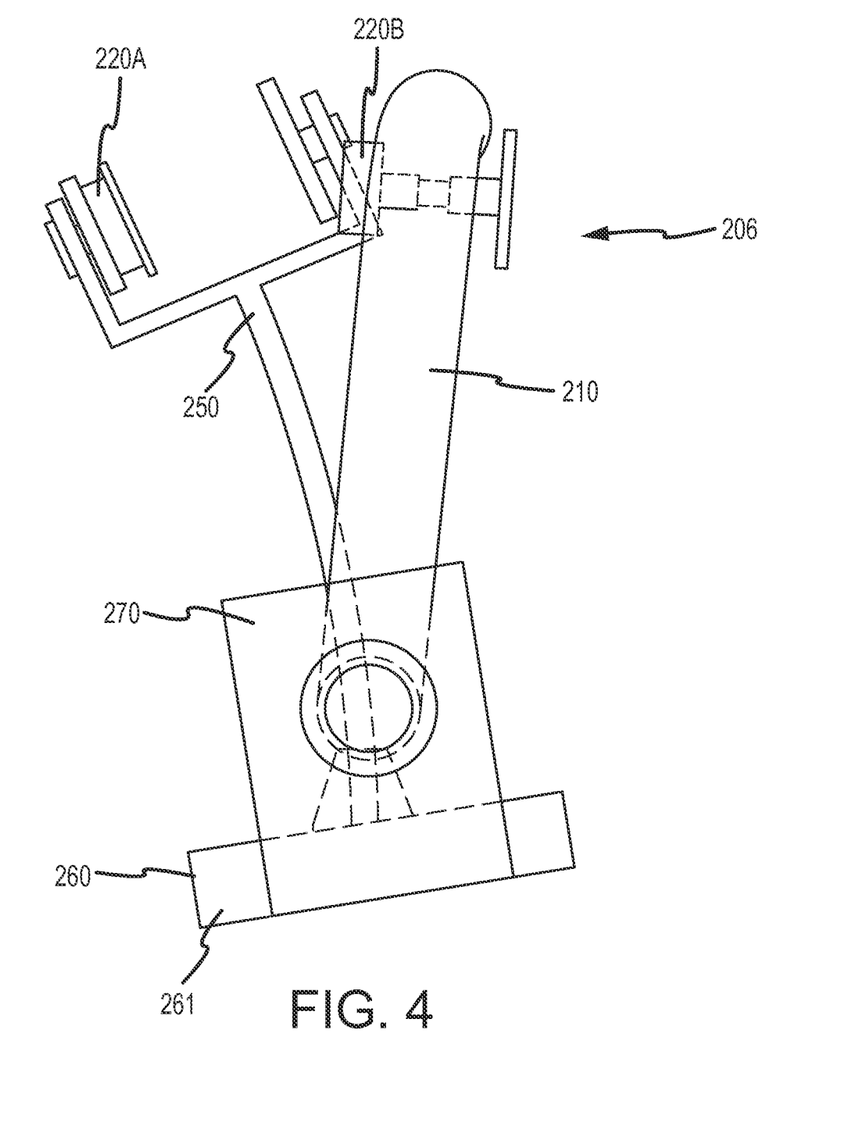
FIG. 4 depicts a vibrating flow meter according to an embodiment of the present invention.

In the present embodiment, the increase in the vibration amplitude of the driven member 250 is reflected as an increase in the range of motion about which the driven member 250 flexes about the base 260. This motion increase is slight, but nevertheless results in additional torque being applied to the base 260 which is further translated as torque to the connectors 270, 271. This additional torque causes the connectors 270, 271 and the base 260 to rotate very slightly, about the axis of the end portions 211, 212 of the conduit 210 in phase with the driven member 250. As shown in FIG. 4, this rotation results in the base 260 rocking slightly, in phase with the driven member 250. Although exaggerated in the figures for illustrative purposes, those of ordinary skill in the art will appreciate that the rocking motion of the base is slight because of the mass of the base 260 and the flexibility of the driven member 250.

Accordingly, the base 260 and connectors 270, 271 rotate about an axis X extending through the end portions 211, 212, in phase with the driven member 250, forming a vibrating system. Whereas the frequency of the conduit 210 decreases due to the initial increase of mass, the coupling of the motion of the driven member 250 with the base 260 and connectors 270, 271 has the same effect; an increase in mass and a decrease in frequency. Thus, the frequency of the driven member 250 is lowered to substantially match the frequency of the conduit 210. Similarly, the coupling of the mass of the base 260 and the connectors 270, 271 increases the amplitude of the driven member 250, such that the momentum of the driven member 250 and base 260 equals the momentum of the flow tube 210, and thus balance is restored.

Similarly, the mass of the conduit 210 may decrease, such as, for example, when the mass of the flowing substance within the conduit 210 decreases. When this occurs, the vibration frequency and the vibration amplitude of the conduit 210 increase. This occurs automatically as a result of the reduction in mass. Further, as a natural response, the vibration amplitude of the driven member 250 decreases. Again, this change in amplitude ratio results in node relocation along the inlet-outlet tube axis X with substantially no impact on the meter output.

Figure 5:
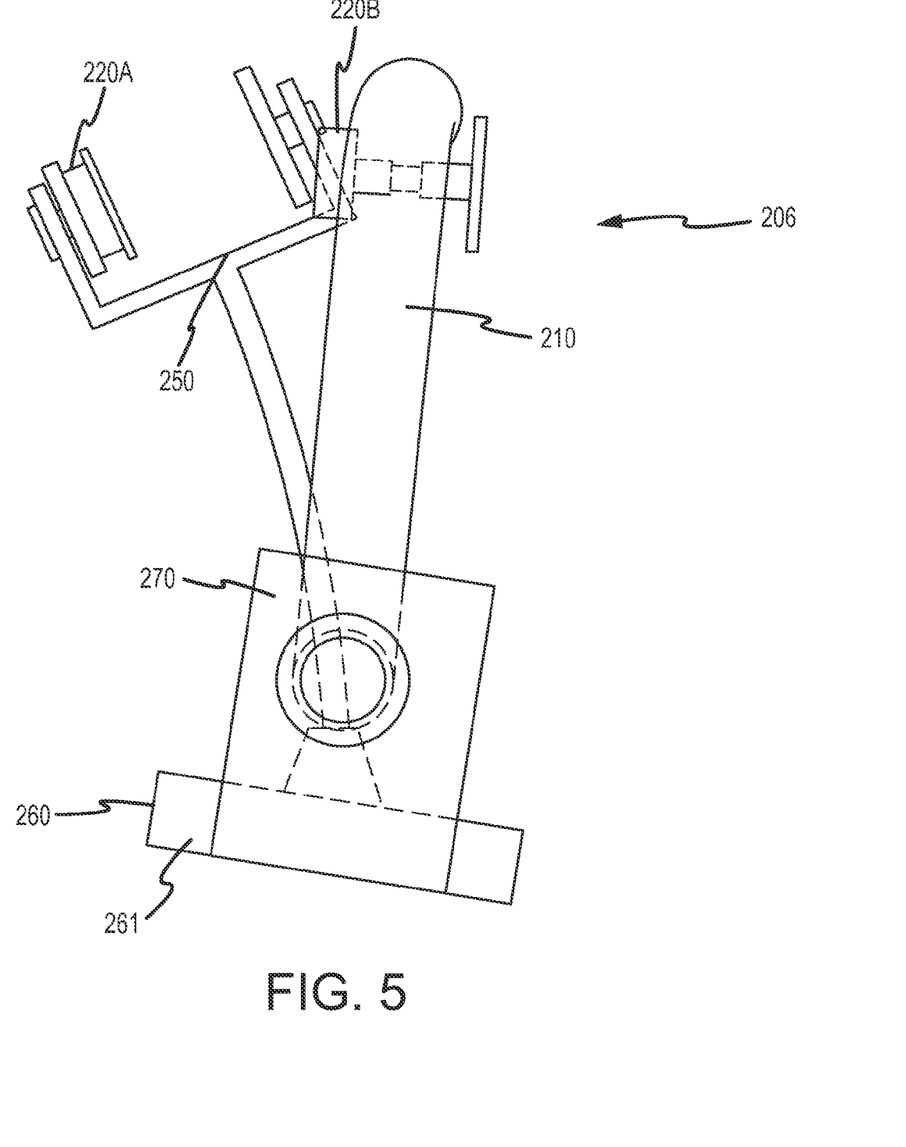
FIG. 5 depicts a vibrating flow meter according to an embodiment of the present invention.

In the present embodiment, the increase in the vibration amplitude of the conduit 210 is reflected as an increase in the range of motion about which the conduit 210 flexes about the axis X of end portions 210, 211. This motion increase again is slight, but nevertheless results in additional torque being applied to the connectors 270, 271, which is further translated as torque to the base 260. This additional torque causes the connectors 270, 271 and the base 260 to rotate very slightly, about the axis X of the end portions 211, 212 of the conduit 210. As shown in FIG. 5, this rotation results in the base 260 rocking slightly, in phase with the conduit 210. Although exaggerated in the figures for illustrative purposes, those of ordinary skill in the art will appreciate that the rocking motion of the base 260 is slight because of the mass of the base 260 and the flexibility of the conduit 210.

Accordingly, the base 260 and connectors 270, 271 rotate about an axis X extending through the end portions 211, 212, in phase with the conduit 210, forming a vibrating system. Whereas the frequency of the conduit 210 is increased due to the lowering of fluid mass, the coupling of the mass of the base 260 and connectors 270, 271 has the opposite effect, lowering the frequency. The net effect is that the frequency is raised slightly. Similarly, the rotation of the mass of the base 260 and the connectors 270, 271 with the flow conduit 210 reduces the amplitude of the driven member 250, and slightly increases its frequency to equal that of the flow conduit 210. Thus, the amplitude ratio of the conduit 210 and the driven member 250 is changed such that the momentum of the driven member 250 and the base 260 is substantially equal to the momentum of the flow conduit 210, and thus, balance is restored.

As the base 260 is preferably provided with a relatively large mass, only a very slight change in the vibration amplitude of the base 260 is required to cause a relatively large change in the vibration characteristics of the conduit 210 and driven member 250. The base 260 slightly rotates with and adds its mass to the flow conduit 210 when a low density fluid is flowing. It slightly rotates with and adds its mass to the driven member 250 when a high density fluid is flowing. It thus adds its mass to the light member (the flow conduit 210 or the driven member 250). Balance is further maintained by the changing of vibration amplitude such that the light member increases its vibration amplitude while the heavier member decreases its vibration amplitude. Furthermore, the small vibration amplitude of the base 260 imparts only a small torque applied to the inner ends of the end portions 211, 212 of the conduit 210. Accordingly, only a very slight amount of torque is applied to the case 300 with fluids of high or low density.

Accordingly, in the present embodiment, the base 260 switches between moving in phase with the conduit 210 and moving in phase with the driven member 250 according to the mass of the flow conduit 210 and more particularly, to the density of the flowing substance. Preferably, the base 260 and the inner ends of the end portions 211, 212 are motionless with flowing substances having a specific gravity of approximately 1000 kg/m$^3$. Preferably, with substances having a specific gravity less than approximately 1000 kg/m$^3$, the conduit 210 has higher amplitude, the driven member 250 has lower amplitude, and the base 260 and connectors 270, 271 rotate very slightly with the conduit 210. The conduit end portions 211, 212, would also rotate very slightly with the conduit 210. Preferably, with substances having a specific gravity of greater than approximately 1000 kg/m$^3$, the conduit 210 has lower amplitude, the driven member 250 has higher amplitude, and the base 260 and connectors 270, 271 rotate very slightly with the driven member 250. In this case, the conduit end portions 211, 212 would also rotate very slightly with the base 260 and connectors 270, 271. Since pure rotation of the conduit 210 does not impart Coriolis acceleration to the flowing substance, meter sensitivity will therefore be largely unaffected. It should be appreciated that the particular fluid densities illustrated above are merely examples and the particular fluid density may vary. According to another embodiment of the invention, the size of the balance structure 208 may be chosen such that the base 260 is substantially motionless when there is no fluid within the conduit 210 (an added density of zero). In this case, the base 260 would rotate slightly flowing with the driven member 250 whenever there is fluid flow. In yet another embodiment, the size of the base 260 may be chosen such that the base 260 rotates with the conduit 210 for all expected fluid density ranges. In other words, some maximum fluid density could be selected where the flow meter is expected to operate with fluids under the maximum fluid density. Therefore, during substantially all expected operating conditions, the fluid density would be under the maximum fluid density resulting in the base 260 rotating with the conduit 210 substantially all of the time. The amplitude of the rotation of the base would, however, vary with the density of the fluid. It should be appreciated that should the fluid density exceed the maximum fluid density, the base 260 would then rotate with the driven member 250 as described above. Likewise, with a fluid density at the maximum fluid density, the base 260 would remain substantially stationary.

It should also be appreciated that while the majority of the description discusses the base 260 moving in response to a change in fluid density, it should be appreciated that other conditions may occur that would change the mass of the conduit 210, such as for example, corrosion, erosion, deposition, etc. Therefore, the base 260 can compensate for a variety of conditions that may change the flow conduit mass.

In the present embodiment, the end portions 211, 212 are preferably long enough, for example, and not limitation, preferably at least three tube diameters long, such that they are substantially soft in torsion. This further reduces the torque applied to the flanges and outer extremities of the end portions 211, 212.

As shown in FIG. 2, the sensor assembly 206 may also include a case 300 and case connects 290, 291. The case connects 290, 291 shown include a first portion 295 connected to the conduit 210 and a second portion 296 connected to the case 300. As shown, the case connects 290, 291 are preferably the only structures supporting the conduit located between the flanges and the connectors 270, 271.

According to one aspect of the present embodiment, the case connects 290, 291 are preferably configured to provide support for the vibrating system that is rigid in axial and transverse translation yet soft in torsion. This may be accomplished by providing the case connects 290, 291 with deformable members 292, 293, 294, for example, which extend radially with respect to the axis of the end portions 211, 212 of the conduit 210. Although three deformable members 292, 293, 294 are provided, it should be appreciated that any number of deformable members 292, 293, 294 may be used and the particular number of deformable members should not limit the scope of the present invention. They may be mounted to the conduit 210 in any manner, including, for example a central hub 295 connected to the conduit 210. The rigid translational and soft torsional coupling provides at least two functions. First, by limiting the end portions 211, 212 to torsional movement, they constrain the nodes to the end portion axis and thus limit measurement errors associated with node relocations. Secondly, by allowing the end portions freedom to rotate, the vibrating structure is supported torsionally in a very soft manner. The soft mount enables the amplitude ratio to change with fluid density and enable the self-balancing feature of this invention.

The present description depicts specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. The detailed descriptions of the above embodiments are not exhaustive descriptions of all embodiments contemplated by the inventors to be within the scope of the invention. Indeed, persons skilled in the art will recognize that certain elements of the above-described embodiments may variously be combined or eliminated to create further embodiments, and such further embodiments fall within the scope and teachings of the invention. It will also be apparent to those of ordinary skill in the art that the above-described embodiments may be combined in whole or in part to create additional embodiments within the scope and teachings of the invention. Thus, although specific embodiments of, and examples for, the invention are described herein for illustrative purposes, various equivalent modifications are possible within the scope of the invention, as those skilled in the relevant art will recognize. The teachings provided herein may be applied to other embodiments than those described above and shown in the accompanying figures. Accordingly, the scope of the invention is determined from the following claims.

I claim:

1. A vibrating flow meter (205) comprising:
    a conduit (210) defining a fluid flow path;
    at least one pick-off (230, 231) that measures the motion of the conduit;
    a driven member (250);
    at least one driver (220) that vibrates the conduit (210) and the driven member (250) in phase opposition;
    a base (260) coupled to the conduit (210) and the driven member (250), said base (260) switching between remaining substantially stationary or moving substantially in phase with the conduit or moving substantially in phase with the driven member (250) in order to balance the motion of the conduit (210) and the driven member (250).

2. The vibrating flow meter (205) according to claim 1, wherein the driven member (250) is a cantilevered arm that extends generally orthogonal to the base (260).

3. The vibrating flow meter (205) according to claim 1, wherein the base (260) is coupled to end portions (211, 212) of the conduit (210) via a pair of connectors (270, 271).

4. The vibrating flow meter (205) according to claim 1, wherein the base (260) is provided with a mass at least 5 times greater than that of the driven member (250).

5. The vibrating flow meter (205) according to claim 1, wherein the base (260) is provided with a base that is at least 5 times greater than the mass of the conduit (210).

6. The vibrating flow meter (205) according to claim 1, wherein the at least one pick-off is located on at least one pick-off arm (280, 281) that extends from the base (260).

7. The vibrating flow meter (205) according to claim 1, further comprising:
    a case (300); and
    case connects (290, 291) that include a first portion coupled to the conduit (210) and a second portion coupled to the case (300).

8. The vibrating flow meter (205) according to claim 1, further comprising:
    a case (300);
    case connects (290, 291) that include a first portion coupled to the conduit (210) and a second portion coupled to the case (300);
    a pair of connectors (270, 271) that couple the base (260) to end portions (211, 212) of the conduit (210); and
    a pair of flanges (106) coupled to the conduit (210), wherein the case connects (290, 291) are the only structure supporting the conduit (210) located between the flanges (106) and the connectors (270, 271).

9. The vibrating flow meter (205) according to claim 1, further comprising:
    a case (300);
    case connects (290, 291) that include a first portion coupled to the conduit (210) and a second portion coupled to the case (300);
    a pair of connectors (270, 271) that couple the base (260) to opposite end portions (211, 212) of the conduit (210); and
    a pair of flanges (106) coupled to the conduit (210), wherein the case connects (290, 291) are the only structure supporting the conduit (210) located between the flanges (106) and the connectors (270, 271) and the end portions (211, 212) extend between the connectors (270, 271) and the flanges (106) and are provided with a length dimensioned to reduce the torque applied to the flanges (106).

10. A method of operating a vibrating flow meter comprising the steps of:
- providing a conduit defining a flow path that receives a flowing substance;
- providing at least one pick-off that measures the motion of the conduit;
- providing a driven member;
- providing at least one driver that vibrates the conduit and the driven member in phase opposition;
- providing a base coupled to the conduit and the driven member; and
- switching the base between remaining substantially stationary or moving substantially in phase with the conduit or moving substantially in phase with the driven member in order to balance the motion of the conduit and the driven member.

11. The method of operating a vibrating flow meter according to claim 10, wherein the base switches between moving in phase with the conduit and moving in phase with the driven member according to a density of the flowing substance.

12. The method of operating a vibrating flow meter according to claim 10, wherein the base is substantially stationary when the flowing substance has a first specific gravity, moves in phase with the driven member when the flowing substance has second specific gravity that is greater than the first specific gravity, and moves in phase with the conduit when the flowing substance has third specific gravity that is less than the first specific gravity.

13. The method of operating a vibrating flow meter according to claim 10, wherein the base is substantially stationary when the flowing substance has a specific gravity substantially equal to 1000 kg/m3.

14. The method of operating a vibrating flow meter according to claim 10, wherein the base is substantially stationary when the conduit is substantially empty.

15. The method of operating a vibrating flow meter according to claim 10, wherein the base moves in phase with the driven member when the flowing substance has a specific gravity greater than 1000 kg/m3.

16. The method of operating a vibrating flow meter according to claim 10, wherein the base moves in phase with the conduit when the flowing substance has a specific gravity less than 1000 kg/m3.

17. The method of operating a vibrating flow meter according to claim 10, wherein the driven member is a cantilevered arm that extends generally orthogonal to the base.

18. The method of operating a vibrating flow meter according to claim 10, wherein the base is a coupled to end portions of the conduit via a pair of connectors.

19. The method of operating a vibrating flow meter according to claim 10, wherein the base is provided with a mass at least 5 times greater than that of the driven member.

20. The method of operating a vibrating flow meter according to claim 10, wherein the base is provided with a base that is at least 5 times greater than the mass of the conduit.

21. The method of operating a vibrating flow meter according to claim 10, wherein the at least one pick-off is located on at least one pick-off arm that extends from the base.

22. The method of operating a vibrating flow meter according to claim 10, further comprising the steps of:
- providing a case; and
- providing case connects that include a first portion coupled to the conduit and a second portion coupled to the case.

23. The method of operating a vibrating flow meter according to claim 10, further comprising the steps of:
- providing a case;
- providing case connects that include a first portion coupled to the conduit and a second portion coupled to the case;
- providing a pair of connectors that couple the base to end portions of the conduit; and
- providing a pair of flanges coupled to the conduit, wherein the case connects are the only structure located between the flanges and the connectors.

24. The method of operating a vibrating flow meter according to claim 10, further comprising the steps of:
- providing a case;
- providing case connects that include a first portion coupled to the conduit and a second portion coupled to the case;
- providing a pair of connectors that couple the base to end portions of the conduit; and
- providing a pair of flanges coupled to the conduit, wherein the case connects are the only structure located between the flanges and the connectors and the end portions extend between the connectors and the flanges and are provided with a length dimensioned to reduce the torque applied to the flanges.

* * * * *